United States Patent
Otani et al.

(10) Patent No.: US 7,059,355 B2
(45) Date of Patent: Jun. 13, 2006

(54) PIPE FOR WATER PIPE AND THE LIKE

(76) Inventors: Tomio Otani, 13-9 Motogo 3-chome, Kawaguchi-shi (JP) 332-0011; Hideyuki Kikuchi, 26-2 Higashi-ryoke 2-chome, Kawaguchi-shi (JP) 332-0003

( * ) Notice: Subject to any disclaimer, the term of this patent is extended or adjusted under 35 U.S.C. 154(b) by 0 days.

(21) Appl. No.: 10/822,128

(22) Filed: Apr. 7, 2004

(65) Prior Publication Data

US 2005/0224126 A1    Oct. 13, 2005

(30) Foreign Application Priority Data

Aug. 14, 2003    (JP) .............................. 2003-326872

(51) Int. Cl.
  *F16L 11/00*    (2006.01)
(52) U.S. Cl. ....................... 138/137; 138/140; 138/146
(58) Field of Classification Search ................ 138/137, 138/140, 141, 145, 146
  See application file for complete search history.

(56) References Cited

U.S. PATENT DOCUMENTS 5,769,971 A * 6/1998 Kuroda et al. .............. 420/434
5,965,007 A * 10/1999 Uzawa ........................ 205/687
2002/0073612 A1* 6/2002 Motai et al. ................... 44/580
2002/0076369 A1* 6/2002 Hwang .................. 422/166.12
2003/0047027 A1* 3/2003 Sato ............................ 75/228
2004/0065625 A1* 4/2004 Fukui et al. ................. 210/748

FOREIGN PATENT DOCUMENTS

JP    05096276 A   *  4/1993
JP    2000264715 A  *  9/2000
JP    2003275084 A  *  9/2003

* cited by examiner

*Primary Examiner*—Patrick Brinson

(57) ABSTRACT

The water pipe includes a pipe body which is used as a water pipe, supply-pipe, drainage pipe, including a mixed layer, provided at an inner surface of the pipe body, the mixed layer including a mortar layer and a resin layer and being mixed into a mixture which includes powder of tourmaline ore, granite and charcoal grain powder with effects for far-infrared ray and anion. Therefore, it can improve water quality efficiently and prevent degradation of a pipe, and it can be used in the large flow velocity region without pressure loss of the water pipe line.

3 Claims, 5 Drawing Sheets

PIPE FOR WATER PIPE AND THE LIKE

FIELD OF THE INVENTION

This invention relates to a pipe such as a water pipe and a supply-pipe that can improve water quality.

BACKGROUND OF THE INVENTION

In the conventional pipe such as water pipe and supply pipe, the normal water pipe usually is used, and there is no improvement for water quality. Moreover, the quantity of chlorine is increased for water pollution and it is carried out the countermeasure with emphasis on disinfection and sterilization, they have developed into the social problem which is generated trihalomethane as carcinogenic substance including the problem of remains chlorine.

Moreover, as post-installation processing, the users attach the water cleaner and water-cleaner equipment, and they buy safe water in the supermarket etc.

Therefore, since there is no improvement for water quality in the conventional pipe such as water pipe and supply pipe, it costs greatly, and it is hard to attach the water cleaner and water-cleaner equipment.

Moreover, in order to attach the water cleaner and water-cleaner equipment in various types of the pipe body, pressure loss of the water pipe line is caused and it is difficult to get sufficient water flow speed.

SUMMARY OF THE INVENTION

Accordingly, it is an object of the present invention to provide a water pipe which can improve water quality efficiently and prevent degradation of a pipe. It is another object of the present invention to provide a water pipe which can be used in the large flow velocity region without pressure loss of the water pipe line.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

DETAILED DESCRIPTION OF THE PREFERRED EMBODIMENTS

Preferred embodiments of the present invention will be described in more detail below with reference to the accompanying drawings.

Figure 1:
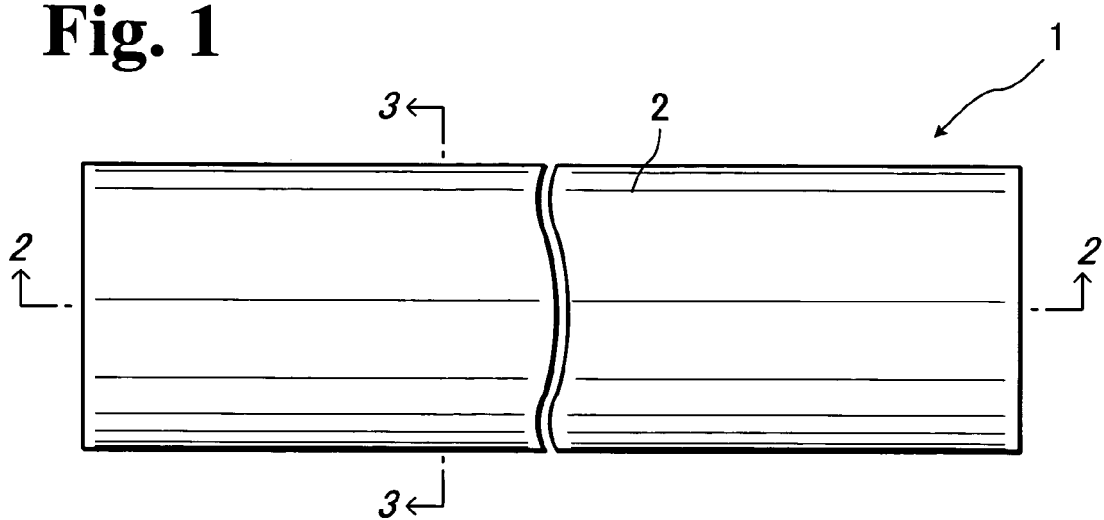
FIG. 1 is a front view showing a first embodiment of the present invention.
Figure 2:
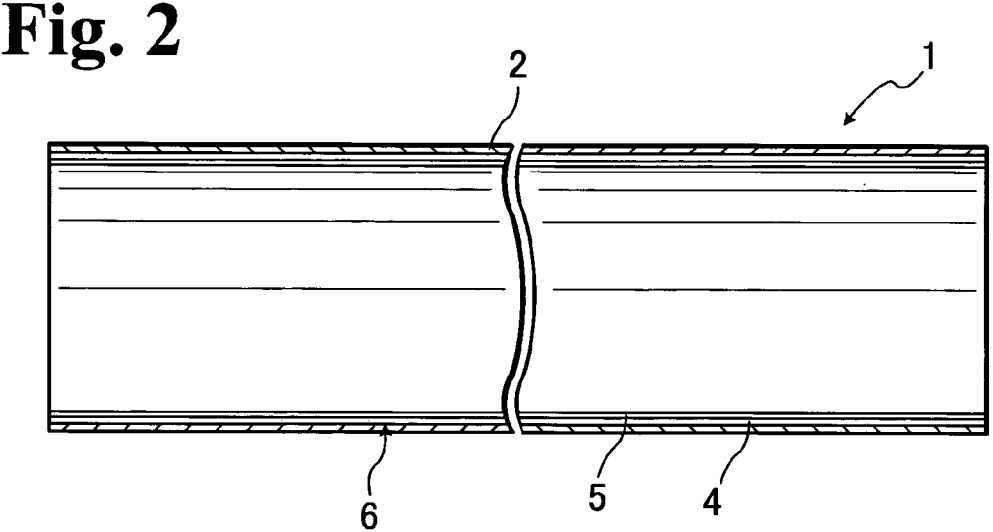
FIG. 2 is a cross sectional view taken along the line 2—2 of FIG. 1.
Figure 3:
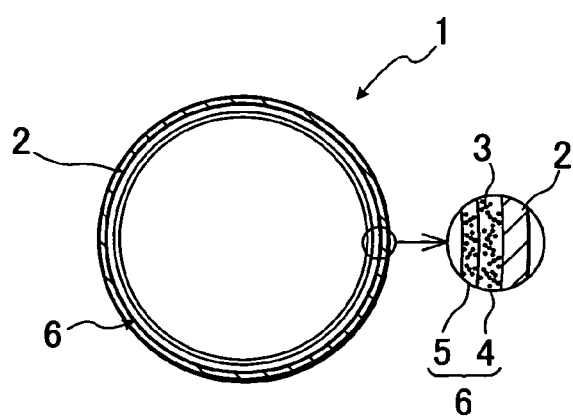
FIG. 3 is a cross sectional view taken along the line 3—3 of FIG. 1.

An understanding of the present invention may be best gained by reference to FIGS. 1–3. FIGS. 1–3 illustrate a pipe of the first embodiment of the present invention. The numeral 1 shows a pipe such as a water pipe and a supply-pipe and comprised of a pipe body 2 which is formed of steel material, metal material and the like used for water pipe, supply-pipe, drainage pipe and so on; and a mixed layer 6, including a mortar layer 4 and a resin layer 5, provided at an inner surface of the pipe body 2. The mortar layer 4 and resin layer 5 are mixed into a mixture 3 including powder of tourmaline ore, granite and the like and charcoal grain powder, wherein the mixed layer irradiates far-infrared rays and anions.

When the tourmaline ore in the mixture 3 contacts water, water is rendered faintly alkaline (approximately pH 8) with electrolysis. Moreover, the hydroxide ion generated during electrolysis combines with a surrounding water molecule and turns into an anion (surface-active substance). Moreover, the molecule of water is subdivided by discharge of radiation (far-infrared ray) with 4–14-micrometer.

In the pipe 1 such as the water pipe, it is installed as usual. When water flows in the pipe 1, the pipe 1 is rubbed physically by water and produces an electrification action. The electrified electric charge discharges by touching water and electrolyzes water. Moreover, pressure change arises to the pipe 1 by change of water stream. This pressure change makes the mixed layer 6 to cause the piezo-effect and is electrified. The electrified electric charge discharges similarly and electrolyzes water.

The molecule ($H_2O$) of water separates into a hydrogen ion ($H+$) and hydroxide ion ($OH-$) and is alkalized when the hydroxide ion ($OH-$) in water increases. However, since it is feeble current, the moisture is rendered faintly alkaline (approximately pH 8).

Moreover, the hydroxide ion ($OH-$) combines with the molecule of water and serves as a surface-active substance called hydroxyl ion ($H_3O_2$). The hydroxyl ion makes a single molecule film and produces the surface-active effect. When hydroxyl ion goes into human's body, it acts on the parts with low resistance, and humors are adjusted to be rendered faintly alkaline, and it makes metabolism active. Moreover, since surface-active water improves permeability and washing power, it is the best for cooking or washing.

In addition, when the above-mentioned pipe 1 is used, the water service institution entrepreneur may work as usual.

Other embodiments of the present invention will now be described with reference to FIGS. 4–11. In FIGS. 4–11, the same components as in the first embodiment described above with reference to FIGS. 4–11 are designated by the same reference numerals and therefore will not be further explained in great detail.

Figure 4:
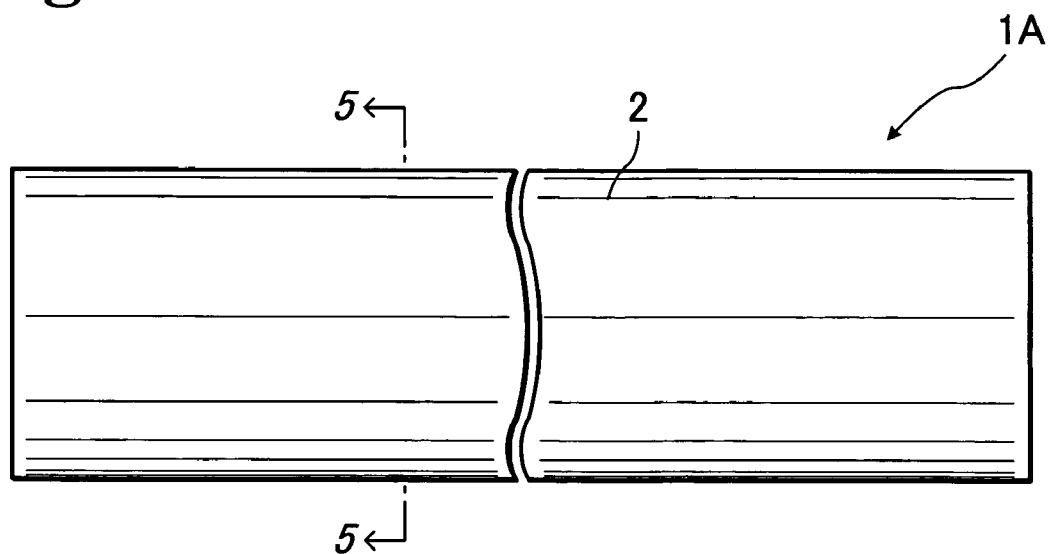
FIG. 4 is a front view showing a second embodiment of the present invention.
Figure 5:
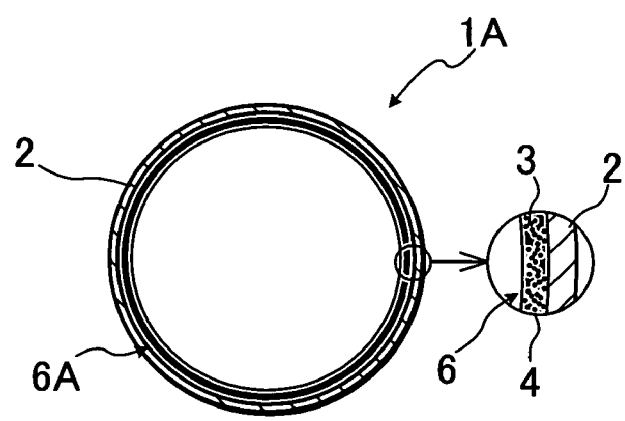
FIG. 5 is a cross sectional view taken along the line 5—5 of FIG. 4.

A second embodiment of the present invention is shown in FIGS. 4–5. It is distinguished from the first embodiment in that the mixed layer 6 is replaced from another mixed layer 6A which includes the mortar layer 4 which is mixed, the mixture 3 including powder of tourmaline ore, granite and the like and charcoal grain powder, wherein the mixed layer irradiates far-infrared rays and anions. Accordingly, a pipe 1A according to the second embodiment will provide similar advantages to that according to the first embodiment.

Figure 6:
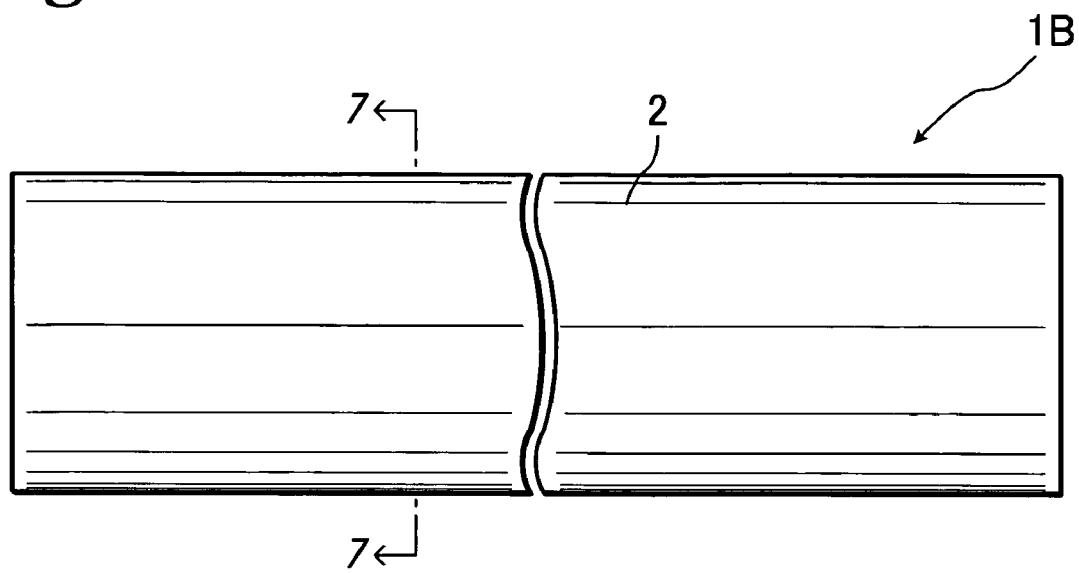
FIG. 6 is a front view showing a third embodiment of the present invention.
Figure 7:
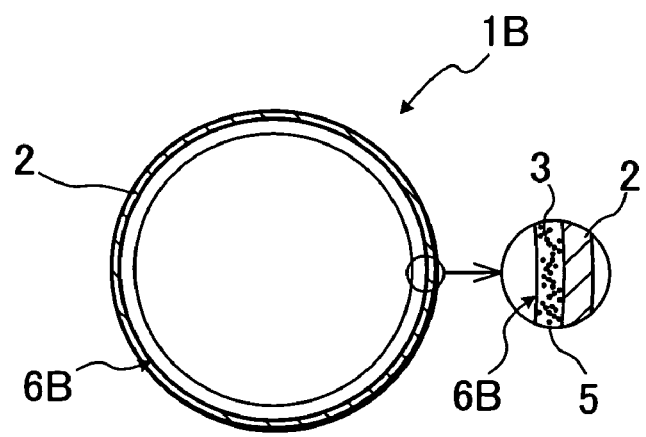
FIG. 7 is a cross sectional view taken along the line 7—7 of FIG. 6.

A third embodiment of the present invention is shown in FIGS. 6–7. It is distinguished from the first embodiment in that the mixed layer 6 is replaced from another mixed layer 6B which includes the resin layer 5 which is mixed, the mixture 3 including powder of tourmaline ore, granite and the like and charcoal grain powder with effects for far-infrared ray and anion. Accordingly, a pipe 1B according to the third embodiment will provide similar advantages to that according to the first embodiment.

Figure 8:
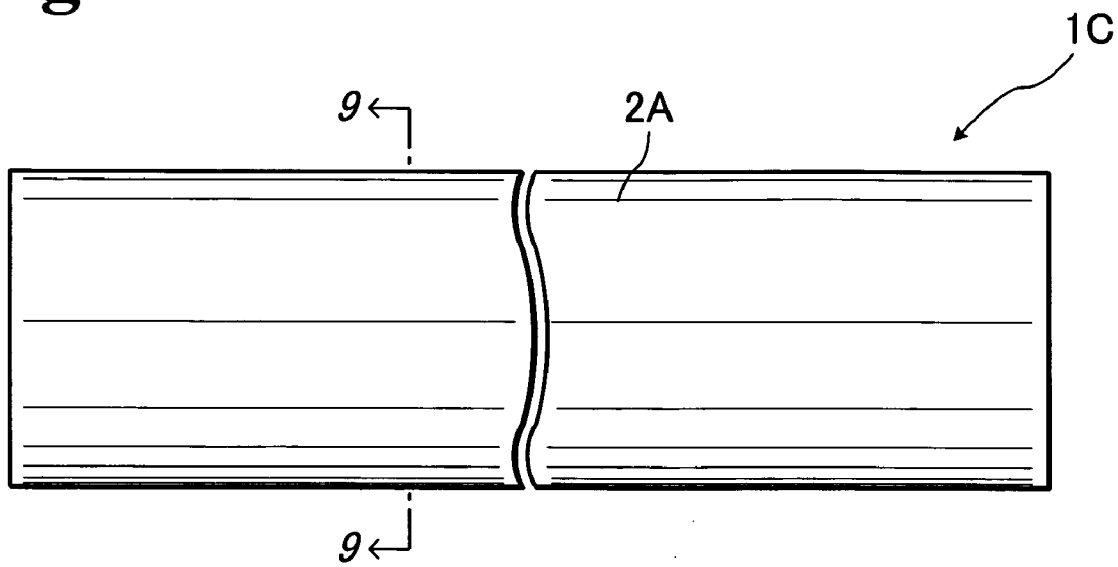
FIG. 8 is a front view showing a fourth embodiment of the present invention.
Figure 9:
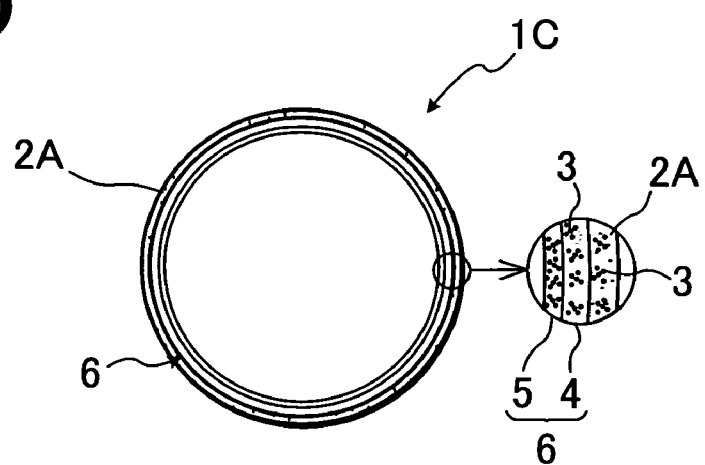
FIG. 9 is a cross sectional view taken along the line 9—9 of FIG. 8.

A fourth embodiment of the present invention is shown in FIGS. 8–9. It is distinguished from the first, second and third embodiments in that the pipe body 2 is replaced from another pipe body 2A that is made of a synthetic resin such as polyvinyl chloride resin, including the mixture 3. Accordingly, a pipe 1C according to the fourth embodiment will provide similar advantages to that according to the first, second and third embodiments.

Figure 10:
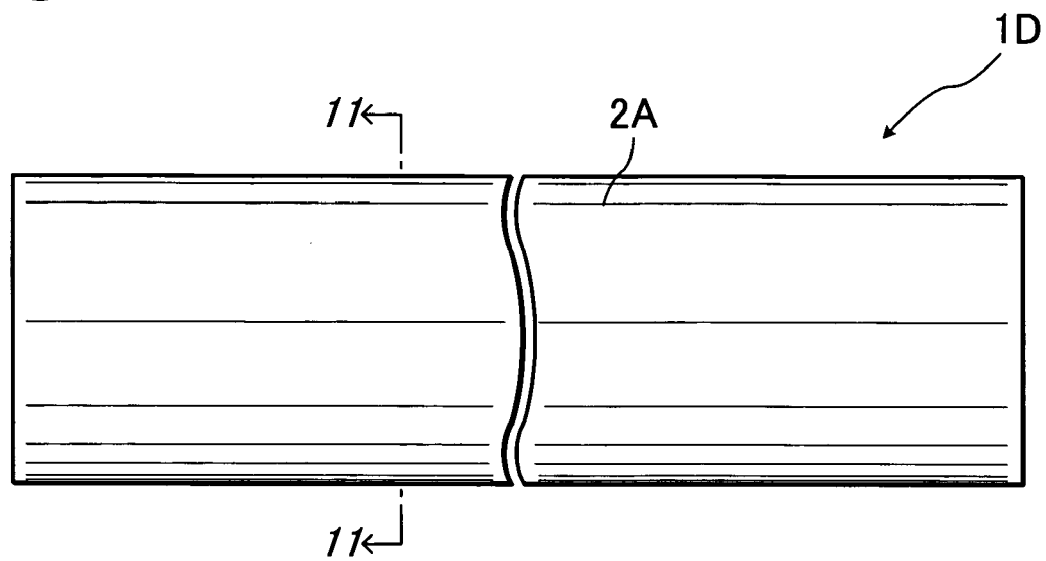
FIG. 10 is a front view showing a fifth embodiment of the present invention.
Figure 11:
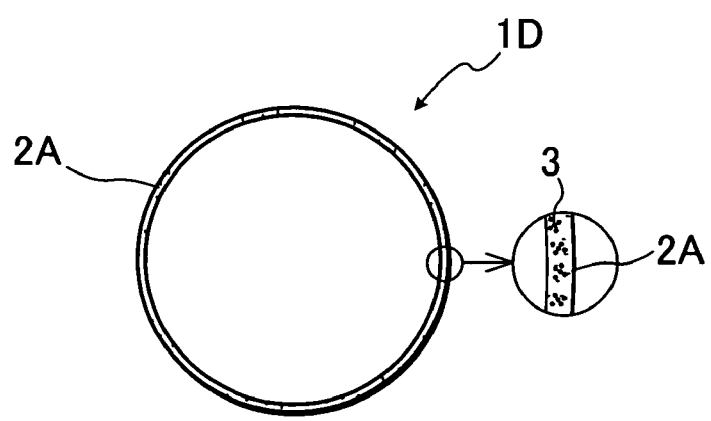
FIG. 11 is a cross sectional view taken along the line 11—11 of FIG. 10.

A fifth embodiment of the present invention is shown in FIGS. 10–11. It is distinguished from the fourth embodiment in that the mixed layer 6, 6A and 6B is not used. Accordingly, a pipe 1D according to the fifth embodiment will provide similar advantages to that according to the fourth embodiment.

Furthermore, although each embodiment differs mainly explained based on the first embodiment, when the composition used for each embodiment uses the present invention is combined, the same effect is achieved.

As set forth above, the advantages of the invention are as follows:

(1) The water pipe includes a pipe body which is used as a water pipe, supply-pipe, drainage pipe and the like, including a mixed layer, provided at an inner surface of the pipe body, mixing a mixture including powder of tourmaline ore, granite and the like and charcoal grain powder, wherein the mixed layer irradiates far-infrared rays and anions. Therefore, the water which flows the inside of a pipe can be energized efficiently.

Therefore, safe water can be always supplied anywhere when the user turns the faucet.

(2) As discussed above, since the mixed layer is formed in the inner wall of the pipe body, it can be prevented to generate rust easily.

(3) As discussed above, it can manufacture cheaply and easily.

(4) As discussed above, since it can be installed as usual, it can be used in the large flow velocity region without pressure loss of the water pipe line.

What is claimed is:

1. A pipe body which is used for one of a water pipe, a supply-pipe and a drainage pipe comprising:
   a mixed layer, provided at an inner surface of the pipe body, the mixed layer including a mortar layer and a resin layer being mixed into a mixture which includes powder of tourmaline ore, granite and charcoal grain powder said mixed layer irradiates far-infrared rays and anions.

2. A pipe body which is used for one of a water pipe, a supply-pipe and a drainage pipe comprising:
   a mixed layer, provided at an inner surface of the pipe body, the mixed layer including a resin layer being mixed into a mixture which includes powder of tourmaline ore, granite and charcoal grain powder said mixed layer irradiates far-infrared rays and anions.

3. A pipe according to either of claims 1 and 2, wherein the pipe body is made of a synthetic resin.

* * * * *